(12) United States Patent
Lovitt

(10) Patent No.: US 9,641,621 B2
(45) Date of Patent: May 2, 2017

(54) SENSOR AWARE PACKET MODIFICATION AND ROUTING

(75) Inventor: Andrew William Lovitt, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 740 days.

(21) Appl. No.: 13/287,566

(22) Filed: Nov. 2, 2011

(65) Prior Publication Data

US 2013/0110462 A1 May 2, 2013

(51) Int. Cl.
*H04L 29/08* (2006.01)
*H04W 84/18* (2009.01)

(52) U.S. Cl.
CPC ............ *H04L 67/125* (2013.01); *H04L 67/12* (2013.01); *H04W 84/18* (2013.01)

(58) Field of Classification Search
CPC ............................... H04L 67/12; H04W 40/24
USPC ......................................................... 702/179
See application file for complete search history.

(56) References Cited

U.S. PATENT DOCUMENTS

| | | | |
|---|---|---|---|
| 5,056,085 A | 10/1991 | Vu | |
| 7,304,976 B2 | 12/2007 | Mao et al. | |
| 7,378,962 B2 * | 5/2008 | Odenwald et al. | ...... 340/539.22 |
| 7,760,718 B2 | 7/2010 | Kamath | |
| 7,983,207 B2 | 7/2011 | Lai et al. | |
| 8,489,463 B2 * | 7/2013 | Sen et al. | ...................... 705/26.1 |
| 2008/0259919 A1 | 10/2008 | Monga | |
| 2008/0267181 A1 | 10/2008 | Monga et al. | |
| 2009/0163214 A1 * | 6/2009 | Trigui | ................... H04W 16/24 |
| | | | 455/446 |
| 2011/0164551 A1 * | 7/2011 | Takebe | .................... H04L 47/10 |
| | | | 370/315 |
| 2012/0197852 A1 * | 8/2012 | Dutta et al. | ................... 707/692 |
| 2012/0327791 A1 * | 12/2012 | Nikkels | ................. H04W 84/18 |
| | | | 370/252 |

FOREIGN PATENT DOCUMENTS

| | | |
|---|---|---|
| CN | 1805371 A | 7/2006 |
| CN | 101399975 A | 4/2009 |
| CN | 101495861 A | 7/2009 |
| CN | 102132132 A | 7/2011 |

OTHER PUBLICATIONS

Al-Karaki, et al., "Data Aggregation and Routing in Wireless Sensor Networks: Optimal and Heuristic Algorithms", in Journal of Computer Networks: The International Journal of Computer and Telecommunications Networking, vol. 53, Issue 7, May 2009, 16 pages.

(Continued)

*Primary Examiner* — Ricky Ngon
(74) *Attorney, Agent, or Firm* — Workman Nydegger

(57) ABSTRACT

Providing sensor collected data. The data is related to sensor collected data. The method includes collecting sensor related data. The method further includes determining a state of an anticipated recipient of the collected sensor related data. The method further includes, based on the state of the anticipated recipient, determining a representation of the sensor collected data. The method further includes sending the sensor collected data in the determined representation.

18 Claims, 5 Drawing Sheets

(56) References Cited

OTHER PUBLICATIONS

Akl, et al., "Grid-based Coordinated Routing in Wireless Sensor Networks", in Proceedings of 4th IEEE Consumer Communications and Networking Conference, Jan. 2007, pp. 860-864.
"Second Office Action Issued in Chinese Patent Application No. 201210430970.6", Mailed Date: Apr. 21, 2015, 12 Pages.
"First Office Action and Search Report Issued in Chinese Patent Application No. 201210430970.6", Mailed Date: Sep. 29, 2014, 13 Pages.
"Third Office Action Issued in Chinese Patent Application No. 201210430970.6", Mailed Date: Aug. 17, 2015, 8 Pages.
"Fourth Office Action Issued in Chinese Patent Application No. 201210430970.6", Mailed Date: Nov. 12, 2015, 8 Pages.

\* cited by examiner

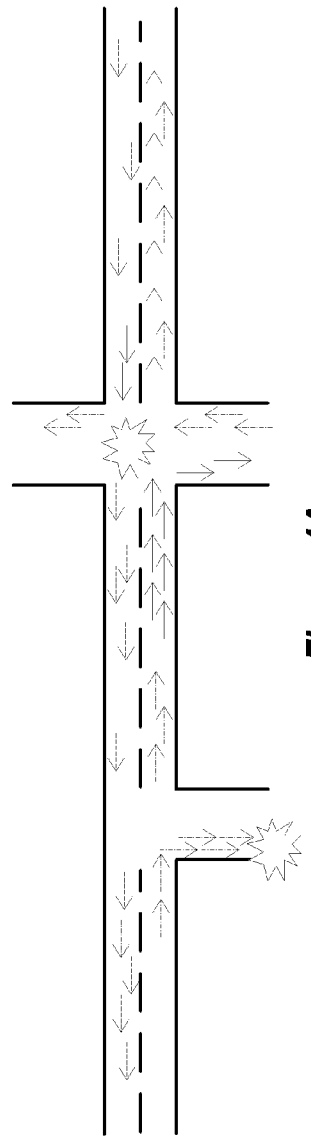
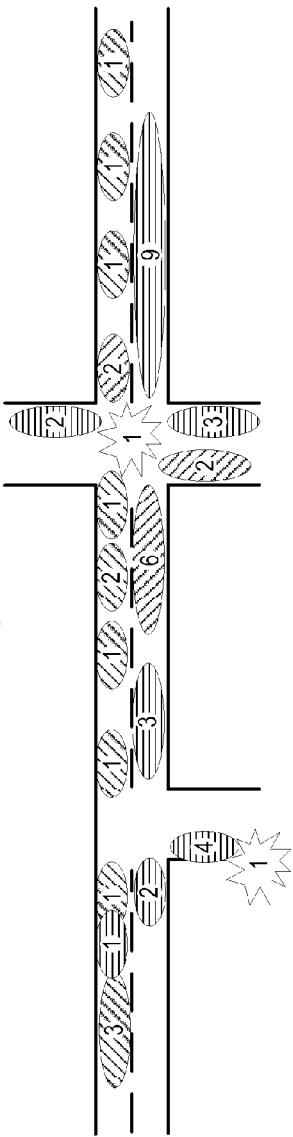
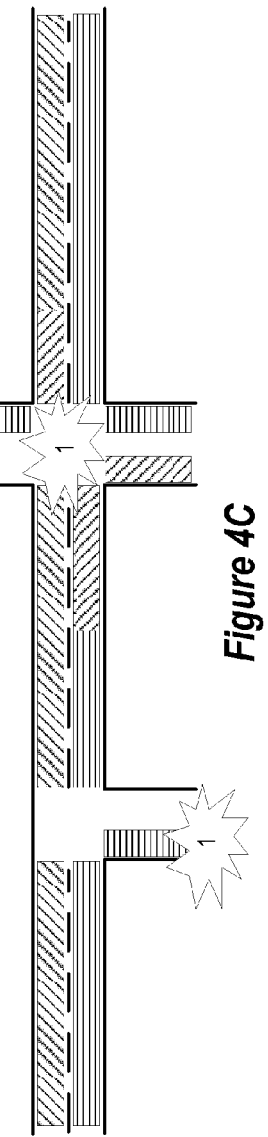
*Figure 4A*
*Figure 4B*
*Figure 4C*

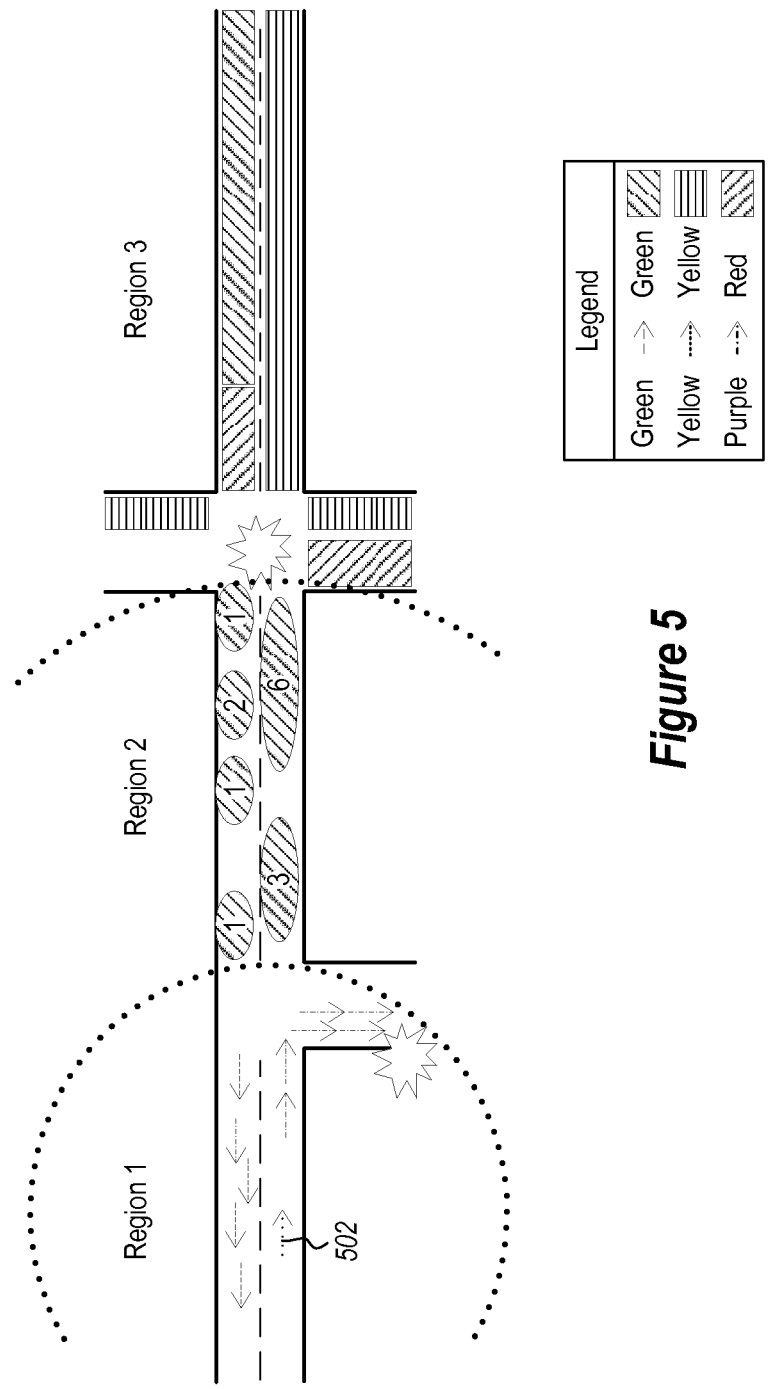

SENSOR AWARE PACKET MODIFICATION AND ROUTING

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

In wireless dynamic networks data congestion may occur when many users wish to propagate data to multiple (or all) users in the mesh. As the mesh grows the amount of information transmitted could easily overwhelm the network bandwidth.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein is directed to a method of providing data. The data is related to sensor collected data. The method includes collecting sensor related data. The method further includes determining a state of an anticipated recipient of the collected sensor related data. The method further includes, based on the state of the anticipated recipient, determining a representation of the sensor collected data. The method further includes sending the sensor collected data in the determined representation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 4A illustrates a graphical representation of sensor collected data;

FIG. 4B illustrates a graphical representation of sensor collected data;

FIG. 4C illustrates a graphical representation of sensor collected data;

FIG. 5 illustrates a graphical representation of sensor collected data;

DETAILED DESCRIPTION

Some embodiments described herein may be able to reduce network traffic by routing and modifying packets based on state as defined by sensor data (possibly fusion with databases or other data) of a receiving device, a sending device, and/or previous routing devices.

Some embodiments described herein may use sensor information at sending, routing, or receiving stations and use this to create a representation of and/or perform actions on the information contained, transmitted, and/or retransmitted. These sensors could be GPS, ACPI (advanced configuration and power interface) state, accelerometer, lighting state, time, proximity, stress, connectivity to wireless networks, temperature, historical sensor data, etc. The actions to the network packets or information can include one or more of: dropping the packet (no further routing), collecting a plurality of packets into one packet through concatenation, collection of a plurality of packets into one packet by combining the data in the various packets, collection of a plurality of packets by combining and pruning the data through generalization, averages, other mathematical and/or logical operations on the data in the various packets, etc. The network system may also combine security (e.g., signing of packets) and/or cloud based services to aid in routing and modification of packets. In some embodiments, the packets may contain meta-information for fast routing and decision making.

As described in more detail below, some embodiments may include one or more of the following features. Embodiments may include an ability to modify or collect and analyze the data in packets based on sensor information. Embodiments may include an ability to compress and/or collect sensor information containing either collections of data and/or individual data points. Embodiments may include an ability to compress, collect, or modify data which is individual endpoint data or a collection of multiple endpoint data. Embodiments may include an ability to combine sensor data with external data (e.g., maps, databases, etc.) either onboard or offboard (e.g., in the cloud) to influence routing. Embodiments may include an ability to concatenate data. Embodiments may include an ability to not forward packets already seen based on the meta-information or actual information in the packet. Embodiments may include an ability to identify the packets and information based on meta-data which may contain information from the data packet or collections of data packets. Embodiments may include an ability to route packets based on sensor information. Embodiments may include an ability to route packets in dynamic network in silicon or software utilizing sensor information to aid in routing. Embodiments may include an ability to not forward packets based on sensor data.

Figure 1:
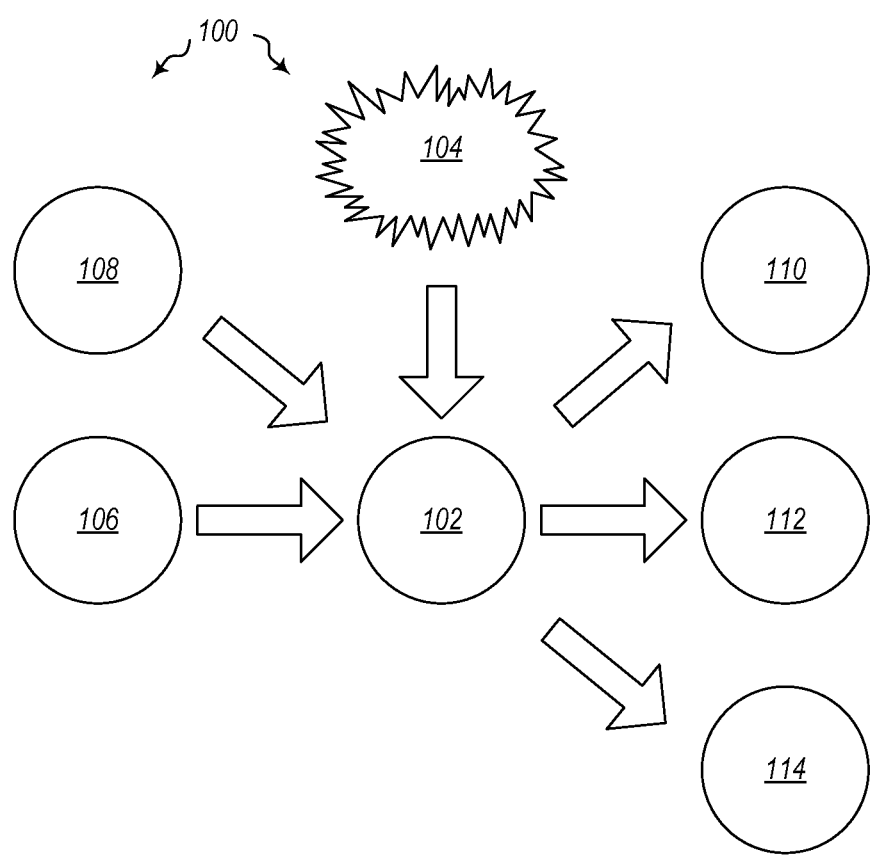
FIG. 1 illustrates a network for collecting and sending sensor related data.

Referring now to FIG. 1, an example is illustrated. FIG. 1 illustrates a node 102, which may be a device in a dynamic network 100, where a dynamic network is one where the network topology could change. The dynamic network 100 may be, for example, an ad-hoc network. The node 102 may receive sensor information from a sensor 104. The sensor 104 may be a part of the device of the node 102 or may be a separate device. Embodiments may route information in a dynamic network 100 based on the state of sensors on a device, such as the node 102, or other nodes in the dynamic network 100. For example, the node 102 may route information to other nodes 110, 112, or 114 on the dynamic network 100 based on the sensor data from the sensor 104 or other sensors. Alternatively or additionally, the nodes 106 and 108 may send data to the node 102, where such information includes or is based on sensor data. The node 102 may use this data received from other nodes 106 and 108 to determine how data is routed, sent or modified to the nodes 110, 112 and 114.

Information sent through the network 100 can be generated periodically or sporadically (non-deterministically). In some embodiments, the information is routed through the dynamic network 100 to inform the other devices 110, 112, and 114 about the state of the device and/or of the environment the device is in. Notably, while in the example shown in FIG. 1, the device 102 sends information to devices 110, 112 and 114, it should be appreciated that information flow may be bi-directional, meaning that node 102 could receive information from nodes 110, 112 and/or 114 and/or send information to nodes 106 and/or 108. Traditionally the information is routed until an end-point is found. However in some dynamic networks the information can be broadcast in addition to, or in place of, point to point delivery. Embodiments may use either software or hardware to inspect packets that are sent among devices and make routing and analytic decisions based on this. For example, through this inspection a device can select to further transmit the packet, modify the packet, or decline to forward the packet. In addition, the packet may contain a header which contains security information (e.g., the information in the packet may be encrypted), meta information about the data the packet contains (e.g., a hash, a hash of hashes, a table of data collected, a time collected, etc.), etc.

The decisions about how the packets of information are routed, sent or modified can be information from one or more different sensors. Examples of such sensors include but are not limited to: a direction sensor, a speed sensor, a GPS sensor, health and/or vital signs sensor for a system operator, an altitude sensor, a barometer, a proximity sensor, an accelerometer, a network state sensor, a cloud service connected sensor, etc.

Additional data may be evaluated with the sensor data to determine how data is routed, sent, modified, and/or represented. For example, data defining a road segment on a map may be used in making routing, sending modification and representation decisions.

When the information is modified it can modified using the data from one or more packets from other nodes which can contain the information of one or more other packets from still other nodes. I.e., the packet can contain any amount of data synthesized from one or more packets which may contain one or more pieces of information. These can then be combined and compressed or rearranged to represent the information in a new or extended way. For instance, in one embodiment, if all of the sensors are measuring barometric pressure then the collection of data may be to take the average of all of the barometric data and transmit only the geospatial coordinates of the data averaged and the average data. In another example, if the sensor data is river flow information, the collected data may be an incremental flow increase at various points in the river based on statistics of many sensors. In yet another example, if the sensor data is traffic speed on a road, the collected data may be road segment, number of cars, and average speed on a segment of a road.

In addition to modifying the data, the system may choose to pass certain pieces of information unmodified in whole or in part. For instance if the network is a dynamic car network the presence of an ambulance or emergency situation may be propagated unchanged for miles.

When information is modified or transmitted a semi-unique or unique key may be included to allow the router to quickly make decisions. These keys can be combined to provide a new key for a collection or a new key may be generated. Any included meta information can also contain time information for the original data, collection time (if any), or any other meta information which when combined with sensor data is used to reroute the packets of information.

The packets of information can contain anything including meta-information about the packet. For instance the packet header may contain a set of short hashes (or similar identifying information) which indicate which information is inside the combined information packet. This can be used to reduce duplicates from being routed. Thus the individual implementation nodes can help prune the information flowing through the network and contamination of the data. The data packets may also be encrypted or contain sender verification information.

The following now illustrate a number of non-limiting examples, which illustrates various scenarios where embodiments may be useful.

Non-Limiting Example #1

A dynamic network is set-up between multiple cars. In this situation the cars want to transmit their position, direction, accidents seen, and road speed. The cars form a dynamic network on the road. Each car individually transmits to the cars around themselves their position. The cars route the packets through the dynamic network to each node. However once the packet gets a certain geospatial distance away from the source car the other cars beyond that distance do not really need to know the exact position of a specific car originally sending a packet, just that there are generally cars there. So once the packet gets a certain geospatial distance away from the source, a car receiving the packet about the source car will combine the information of the source car with other cars in the general geospatial area of the source car. This could be through statistical analysis of the cars in that area, or through averaging the speeds of all cars going each direction and sending that information along. This new packet with an aggregated representation of data is then sent further across the network.

Figure 2:
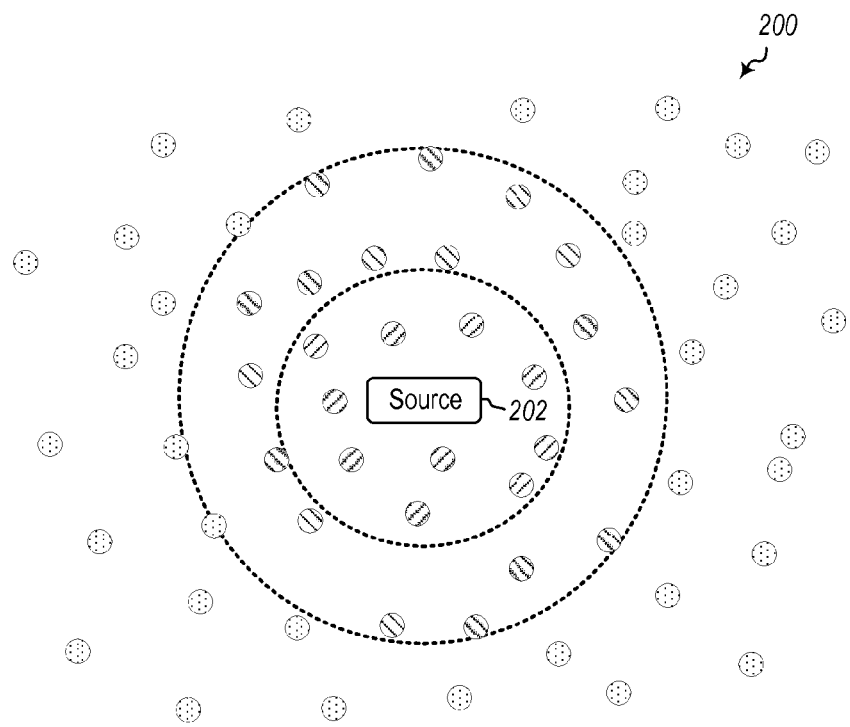
FIG. 2 illustrates another example of a network for collecting and sending sensor related data based on geospatial proximity.

FIG. 2 illustrates this example. FIG. 2 shows a dynamic network 200 of nodes represented by the combination of a source 202 and a number of other nodes represented with color coding as red, purple, or blue, depending on their geospatial relationship with the source 202. The dynamic network 200 can be defined in any practical way. FIG. 2 illustrates information spread from the source 202 in the middle. Any node (which may be for example a router, device, vehicle, etc) represented by the red color code will collect and retransmit the information sent from the source 202 unmodified. Thus all red nodes have complete access to the information transmitted by the source.

When the nodes denoted by purple color coding collect the information from the source 202 they will package up the information from the source 202 with similar data from other sources. For instance a node may collect data transmitted within a time frame for nodes in a particular geospatial region into one new packet (with or without hashes or other information identifying the constituent parts). Then this packet is transmitted. Thus all purple nodes will only be able to see general and likely not specific information about the source 202 and other similarly situated nodes. This process can happen many times across the entire network as the sensor information changes.

In this example the sensor information may include the position on a 2-D plane (like a map or surface of a large sphere) describing an area proximate the source 202. If the information transmitted included direction, position, and speed, the red colored nodes would be able to know the location of specific nodes (and in particular, the source node) on the map. The purple nodes might know general information, related to the source 202 and a map, such as congestion (e.g., how many cars are in an area) and things like average speed of cars proximate the source 202. The blue nodes, with respect to the source 202, could see the information from the purple and red (and possibly other regions) collapsed into traffic patterns and speeds or other aggregations of information. If the information from the source 202 is accident data then all of the red nodes could pinpoint the wreck whereas the blue nodes may just know that there is an accident in the general area including the source 202. However in cases where the information is transmitted without modification or aggregation, all nodes would have access to the same information.

Non-Limiting Example #1a

In the Examples in #1 the new packet is created based on distance from an originating source 202 of information, and thus a car receiving the information will combine that information with more data to create less fine-grained data about that region and time. This information could at anytime be offloaded to a land-based network (dynamic or otherwise) for further transmission to the cloud, to other cars through this or another transmitter, etc. For example, this may be the blue nodes of FIG. 2.

Non-Limiting Example #1b

Figure 3:
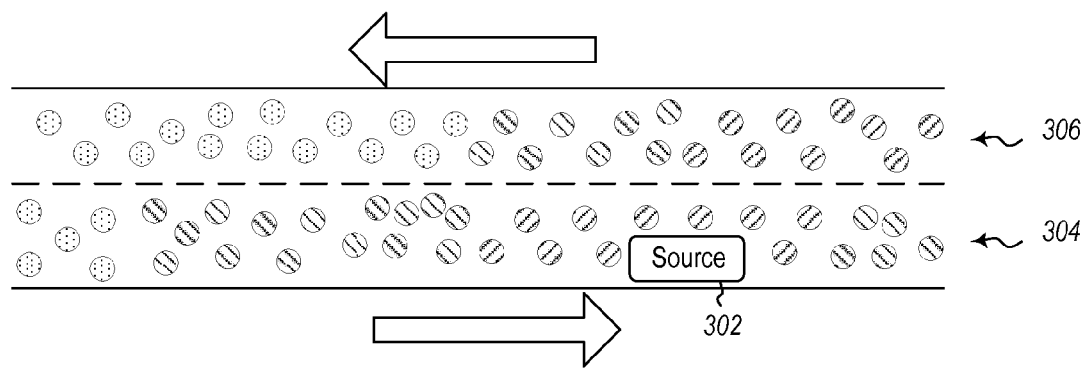
FIG. 3 illustrates yet another example of a network for collecting and sending sensor related data based on geospatial proximity and direction where the sensors are constrained geospatially.

In an alternative to the Example #1, the boundary for combining packets may not be a proximity boundary, but instead is based on the direction a source car is moving. For instance, rules may be implemented such that data from a car in the road, including precise information about the car, may be transmitted two times further in the opposite direction of travel than the direction of travel. This is because the cars behind the car would like to know how the traffic is up ahead and how congested it is, whereas the cars in front may not care about the cars very far behind them traveling in the same direction. An Example is illustrated in FIG. 3. FIG. 3 shows the area of information content for a specific scenario. In this case, as in FIG. 2, focus is on the area where the information is received (similar to FIG. 2 in coloring and content). For this example it is assumed that the source 302 is a car and the information being transmitted is speed, position, etc. In this case non-symmetric rules for routing based on the direction of flow are implemented. In this example a first lane 304 is traveling to the right and the second lane 306 is traveling to the left. In FIG. 3, the nodes which would need precise information about the source 302 are those in other direction approaching the source 302. This may be done in case the source 302 swerves into a receiver node's lane. Further if an approaching node desires to pass another approaching node knowledge of where the source 302 is can help inform that decision. Further the nodes in the same lane that are directly and swiftly impacted by the source, nodes that would need to slow down or swerve (to the left of the source in FIG. 3) and those in front for a short ways. The nodes with slightly less fine-grained information (purple) are the nodes which have passed the source or are further away in the same lane. In this case the flow of the traffic with the source is of interest but the specific movements of the source have less impact on the node. The nodes in the same lane as the source have more area where they are impacted by the source from a larger view because this could cause traffic ahead to slow down and thus a car may want to know about those changes.

Non-Limiting Example #1c

In this example, the network illustrated in Example 1b may further be designed to also route based on an elapsed time of data points. For example, all packets that are individual sources are allowed to travel in the network for 5 seconds. The collection of individual sources data (denoted 'collection level 1') is allowed to live in the network for 60 seconds. The collection of 'collection level 1' packets are allowed to travel in the network for 5 minutes. This allows the router to drop information that is stale once a certain threshold is reached. As the data is further collected and collapsed the data can live in the network for longer periods relative to the period of time where the data is collapsed. For instance a second collection level may collect 10 seconds of data together (i.e. two level 1 packets). In the illustrated example, this may be allowed to live in the network for 3 minutes. Additionally, in one example, a possible collection level 3 may collect two level 2 packets but not extend the life of the packet in the network.

Non-Limiting Example #1d

A node in the network may have seen the same packet some number of times. This may cause the node to not retransmit the packet since that information has already been transmitted before.

Non-Limiting Example #1e

FIGS. 4A through 4C illustrate a graphical representation of another non-limiting possible example of automotive data in a dynamic network. In this case the information sent is accident or work zone data (denoted by stars), individual speed, position, and direction information (colored arrows), and speed zone (denoted by colored bars). FIG. 4A represents the information if all of the nodes were red nodes with respect to each other. Specifically, information about individual nodes can be graphically illustrated. FIG. 4B illustrates an example, of a view of purple nodes with respect to a given node. Specifically, data for individual nodes is aggregated, but some grouped detail is still nonetheless shown. For example, FIG. 4B includes representations of similarly situated nodes. FIG. 4C illustrates what the data would look like if that data was shown to blue nodes or otherwise generally illustrated. Less detail would be shown and more general representations would be illustrated. This illustrates one possible information adjustment strategy based on a possible implementation of some embodiments. A node would see for red nodes individual units of information for all data collected. A node would see for purple nodes information collected into grouping of similar data to reduce the amount of information needed. A node would see for purple nodes regions colored based on statistics of the data contained. It should be noted that this would be the information seen to an observer placed in the region for FIG. 4A, near the region for FIG. 4B, or further from the region for FIG. 4C.

FIG. 5 illustrates an aggregated view showing representations of data packets that a receiver might receive. FIG. 5 shows the information seen by the receiver 502 for the example in FIGS. 4A-4C. In this example there is a near region (denoted 'Region 1') where precise information is transmitted to the receiver. In 'Region 2' the information is less fine grained and further away from the receiver. In 'Region 3' only broad amounts of information in received by the receiver Non-Limiting Example #2

In this example the consumer may be a police car. While the network processes information on speed and direction the network also passes, unchanged, accident information. Thus a police car can be monitoring the network and know when an accident happens anywhere in the network. The system can also provide routing computations for the police officer to the accident due to the traffic data contained in the network as described previously.

Non-Limiting Example #3

In this example a natural disaster, such as an earthquake, may occur where all of the buildings have damage sensors embedded in the walls. When an ad-hoc sensor network is set up the information is sent through the ad-hoc network which is picked up by first responders. The ad-hoc sensor network may include embedded sensors embedded in walls or other structural components. The goal of the first responders is to respond to the buildings which have the most damage. In this case by just being a node in the ad-hoc network the responders could see which areas of the city are most damaged due to the packet routing and combination of packet data for different nodes. As the first responders move to a specific area the network will provide more fine-grained data to the responders so they can pinpoint the building needing attention. The routing in this case collects the statistics on the health of a building and sends that information along. In this case the collection comprises either statistics or other mathematical and/or logical operations on the data to provide fine grained information close to the source and less fine grained far away.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
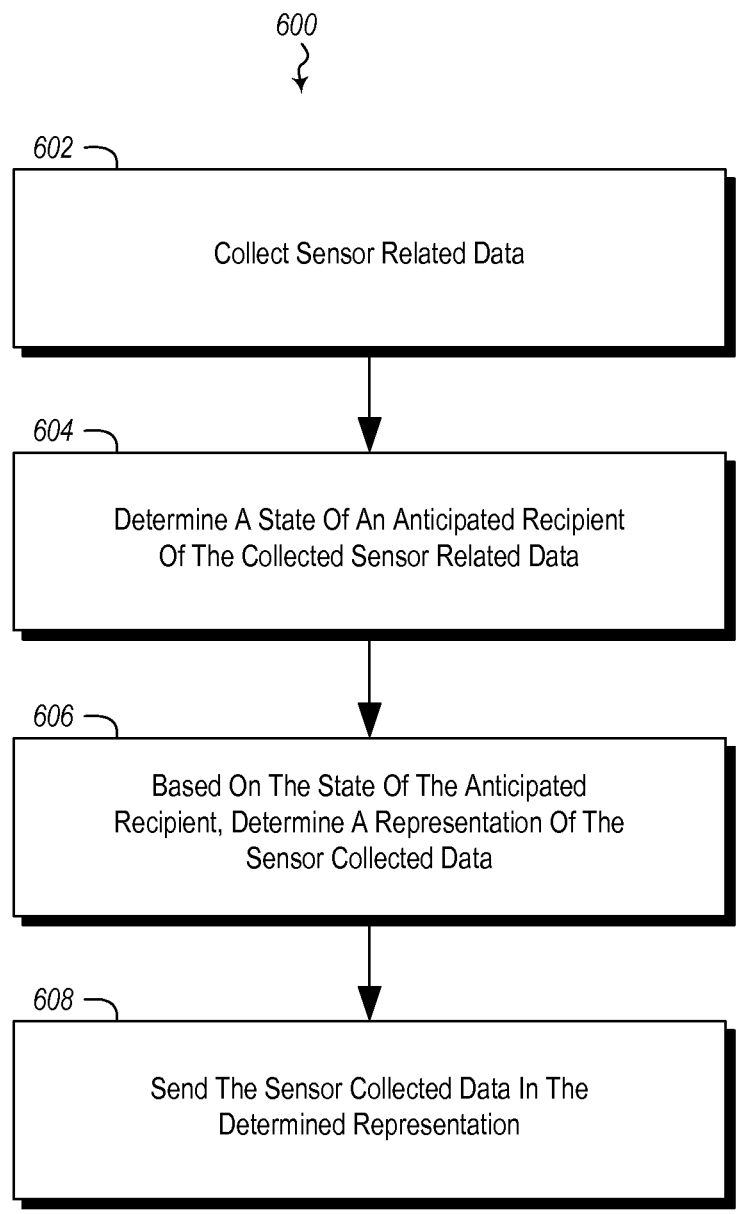
FIG. 6 illustrates a method of providing sensor collected data.

Referring now to FIG. 6, a method 600 is illustrated. The method 600 includes acts for providing data. The data is related to sensor collected data. The method 600 includes collecting sensor related data (act 602). For example, with reference to FIG. 1, a source node 102 may collect data from a sensor 104. Alternatively or additionally, a source node 102 may collect data from other nodes, such as nodes 106 and/or 108 where those nodes have collected to data from sensors local to those nodes, or have received sensor related data from still other nodes.

The method 600 further includes determining a state of an anticipated recipient of the collected sensor related data (act 604). For example, and with reference to FIG. 2, a source node 202 may determine a recipient is a red node, a purple node, or a blue node. In a particular example, a source node 202; may determine that recipients are near the source node 202 (red nodes), an intermediate distance from the source node 202 (purple nodes) or more distant from the source node 202 (blue nodes). Notably, determining a state of an anticipated node does not necessarily require determining actual state of an actual node. Rather, the determination may be of an anticipated state of an anticipated recipient. For example while there may be no actual purple nodes with respect to the source node 202, the source node 202 can nonetheless anticipate that purple nodes might be a recipient. Thus, the anticipated recipient may not, and may never actually exist.

The method 600 further includes based on the state of the anticipated recipient, determining a representation of the sensor collected data (act 606). For example, in FIG. 2, the determined representation may be as raw data for red nodes, aggregated data for blue nodes, and/or even further aggregated data for blue nodes. Various methods of aggregations will be discussed below.

The method 600 further includes sending the sensor collected data in the determined representation (act 608). For example, a source may propagate the representations through a dynamic network. Note that in some embodiments, a determination may be made to not send data. For example, a node can determine that data has already been sent and thus prevent data from being sent again.

The method 600 may be practiced where sending the sensor collected data in the determined representation comprises sending the sensor collected data unchanged and un-aggregated. For example, as shown in FIG. 2, the source node 202 may send data to red nodes unchanged and un-aggregated.

The method 600 may be practiced where a node in a network performs the acts, and wherein the node always sends its own state based on sensor collected data at the node. For example, as shown in FIG. 1, the source node 102 may always send the state of the source node 102 as based upon data collected from the sensor 104. This may be in addition to any other representation, such as aggregated representations of node state.

Sending the sensor collected data can be done in a number of different ways. For example, in some embodiments, the sensor collected data can be broadcast generally such that any node in a network can obtain the data. Alternatively, the data may be routed specifically to certain nodes. Further, in some embodiments, the method 600 may be practiced where sending the sensor collected data in the determined representation comprises physically sending data in a given direction based on the state of the anticipated recipient. For example, directional wireless antennas may be used to cause a signal to be physically be directed towards certain nodes. For example, in some embodiments where a source node is a car, the signal may be directed more strongly behind the car than in front of the car, as other cars behind the source car have more interest in the source car than cars in front of the source car.

The method 600 may be practiced where sending the sensor collected data in the determined representation comprises only sending the sensor collected data over wireless channels for a topologically changing network. For example, in a network where network nodes move (such as the car examples illustrated above) it may be useful to implement the system over wireless, as opposed to wired networks.

The method 600 may be practiced where determining a representation of the sensor collected data comprises determining that the sensor collected data should be illustrated in a representation of aggregated raw states of a plurality of nodes. For example, the raw states of the plurality of nodes may be aggregated by a mathematical operation such as averaging, providing a count, mean, etc. Alternatively or additionally, the raw states of the plurality of nodes may be aggregated by a logical operation, such as concatenation of various packets, ORing, ANDing, XORing, and their variants, etc. Alternatively or additionally, the raw states of the plurality of nodes may be aggregated by a statistical operation.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method of selectively providing sensor collected data to an anticipated recipient in a collapsed or un-collapsed format based at least on a determined location or movement of the anticipated recipient, the method performed by executing computer-executable instructions upon one or more processors of a computing system, the method comprising:
  collecting sensor related data comprising a plurality of data packets from one or more sensors;
  determining one or more of a physical location or movement of an anticipated recipient of the collected sensor related data;
  based on at least one of the determined physical location or movement of the anticipated recipient, determining whether to send the collected sensor related data to the anticipated recipient in a collapsed state that includes at least one new data packet that is based at least in part on the collected sensor related data or, alternatively, whether to send the collected sensor related data to the intended recipient in an un-collapsed sate;
  reducing network congestion by at least collapsing at least some of the collected sensor related data prior to sending the collected sensor related data in a collapsed state to at least one recipient; and
  sending at least some of the collected sensor related data in either the collapsed state or the un-collapsed state to the anticipated recipient, selectively based on at least the determined physical location or movement of the anticipated recipient.

2. The method of claim 1, wherein the computing system is a node in a network, and wherein the node always sends its own state based on sensor collected data at the node.

3. The method of claim 1, wherein the sending comprises physically sending data in a given direction based on the determined physical location of the anticipated recipient.

4. The method of claim 1, wherein the sending comprises sending data over wireless channels for a topologically changing network.

5. The method of claim 1, wherein the sensor collected data is collapsed into a representation of aggregated raw states of a plurality of nodes.

6. The method of claim 5, wherein the raw states of the plurality of nodes are aggregated by a mathematical operation.

7. The method of claim 5, wherein the raw states of the plurality of nodes are aggregated by a logical operation.

8. The method of claim 5, wherein the raw states of the plurality of nodes are aggregated by a statistical operation.

9. The method of claim 1, wherein collecting sensor related data comprises receiving data from another node in a network.

10. One or more computer readable hardware storage devices comprising computer executable instructions that are executable by one or more processors to cause a computing system to perform the following:
  collecting sensor related data comprising a plurality of data packets from one or more sensors;
  determining one or more of a physical location or movement of an anticipated recipient of the collected sensor related data;
  based on at least one of the determined physical location or movement of the anticipated recipient, determining whether to send the collected sensor related data to the anticipated recipient in a collapsed state that includes at least one new data packet that is based at least in part on the collected sensor related data or, alternatively, whether to send the collected sensor related data to the intended recipient in an un-collapsed state;
  reducing network congestion by at least collapsing at least some of the collected sensor related data prior to sending the collected sensor related data in a collapsed state to at least one recipient; and
  sending at least some of the collected sensor related data in either the collapsed state or the un-collapsed state to the anticipated recipient, selectively based on at least the determined physical location or movement of the anticipated recipient.

11. A computing system comprising:
  one or more processors;
  one or more computer readable storage devices having stored computer executable instructions that are executable by the one or more processors to cause the computing system to:
    collecting sensor related data comprising a plurality of data packets from one or more sensors;
    determining one or more of a physical location or movement of an anticipated recipient of the collected sensor related data;
    based on at least one of the determined physical location or movement of the anticipated recipient, determining whether to send the collected sensor related data to the anticipated recipient in a collapsed state that includes at least one new data packet that is based at least in part on the collected sensor related data or, alternatively, whether to send the collected sensor related data to the intended recipient in an un-collapsed state;
    reducing network congestion by at least collapsing at least some of the collected sensor related data prior to sending the collected sensor related data in a collapsed state to at least one recipient; and
    sending at least some of the collected sensor related data in either the collapsed state or the un-collapsed state to the anticipated recipient, selectively based on at least the determined physical location or movement of the anticipated recipient.

12. The computing system of claim 11, wherein the collected sensor related data is sent to the anticipated recipient in the collapsed state in response to determining that the determined physical location of the anticipated recipient is a located a predetermined distance away from the computing system.

13. The computing system of claim 12, wherein the determined physical location is an anticipated location.

14. The computing system of claim 11, wherein the collected sensor related data is sent to the anticipated recipient in the collapsed state in response to determining that the anticipated recipient is moving away from the computing system, based on at least the determined movement of the anticipated recipient.

15. The computing system of claim 11, wherein the method further includes determining a data packet is a duplicate and omitting the data packet that is determined to be a duplicate from the new data packet.

16. The computing system of claim 11, wherein each of the data packets includes a key and wherein sending the collected sensor related data in the collapsed state includes combining a plurality of keys from the data packets into a new key that is included with the at least one new data packet.

17. The computing system of claim 11, wherein collected sensor related data is only permitted to persist for a predetermined period of time after being collected, such that the computing system refrains from transmitting the collected sensor related data when a duration of time associated with the collected sensor related data exceeds the predetermined period of time.

18. The computing system of claim 17, wherein the method further includes extending the predetermined period of time upon determining that the collected sensor related data has been sent in the collapsed state.

* * * * *